July 5, 1932.  C. H. ZIERDT  1,865,450

RECTIFIER

Filed Jan. 6, 1930  2 Sheets-Sheet 1

INVENTOR
Conrad H. Zierdt
BY
E. C. Sanborn
ATTORNEY

July 5, 1932.  C. H. ZIERDT  1,865,450
RECTIFIER
Filed Jan. 6, 1930  2 Sheets-Sheet 2
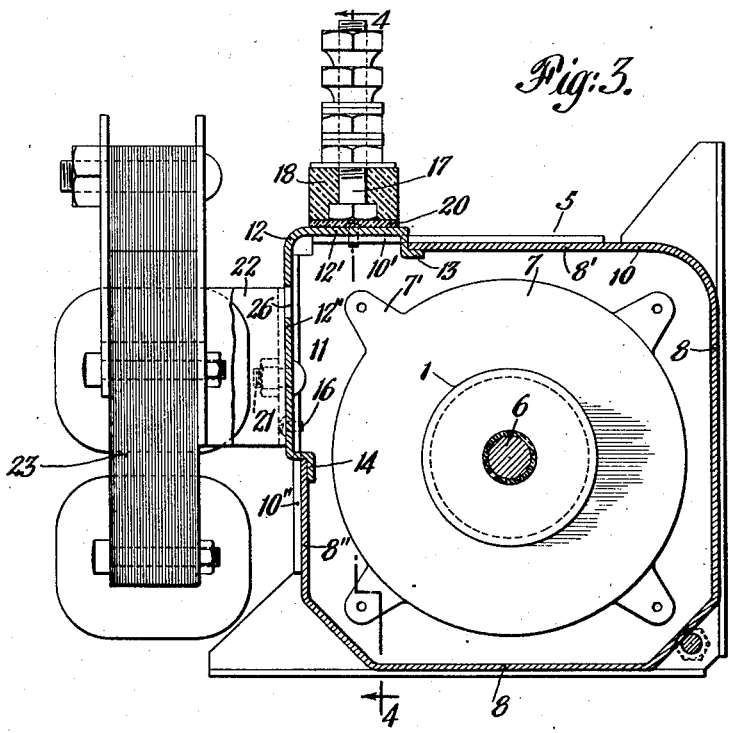
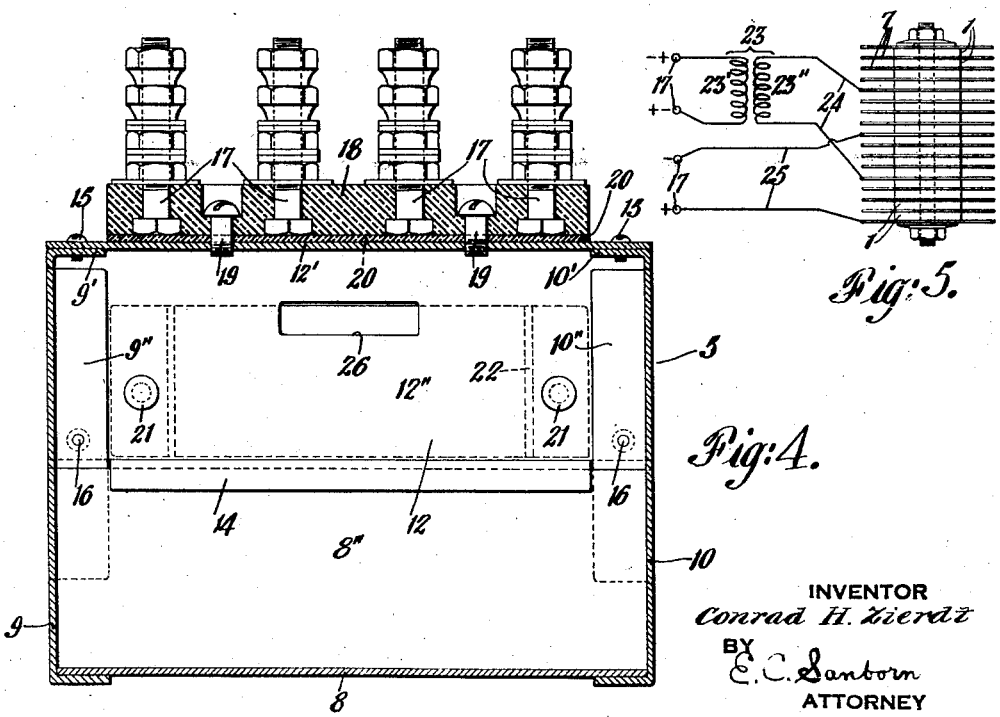
INVENTOR
Conrad H. Zierdt
BY
E. C. Sanborn
ATTORNEY Patented July 5, 1932

1,865,450

UNITED STATES PATENT OFFICE

CONRAD H. ZIERDT, OF ROSEDALE, PENN TOWNSHIP, PENNSYLVANIA, ASSIGNOR TO THE UNION SWITCH & SIGNAL COMPANY, OF SWISSVALE, PENNSYLVANIA, A CORPORATION OF PENNSYLVANIA

RECTIFIER

Application filed January 6, 1930. Serial No. 418,714.

This invention relates to rectifiers and has for its prime object the provision of improved and effective means for facilitating the locating of a rectifier unit in proper relation to its housing and for maintaining such relation. Another object is to provide means which performs the function above stated and which also insulates the rectifier from said housing. Other features of the invention will be hereinafter described and claimed.

In the accompanying drawings:

Fig. 3 is a transverse vertical sectional view on line 3—3 of Fig. 2.

Fig. 4 is a longitudinal vertical sectional view on line 4—4 of Fig. 3.

Fig. 5 is a wiring diagram, and

Similar reference numerals designate similar parts throughout the several views.

Figures 1, 2, 6:
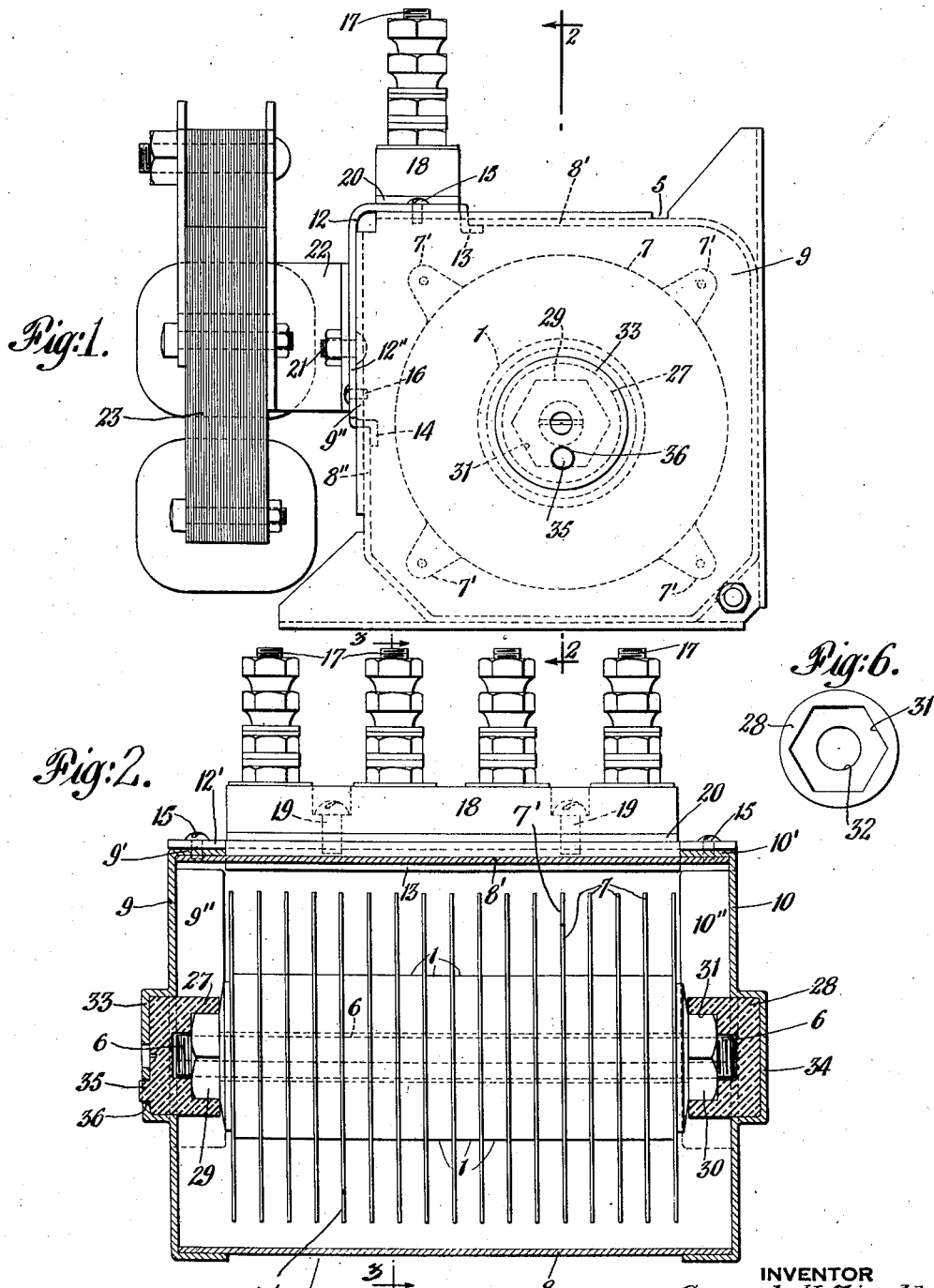
Fig. 1 is a view in side elevation of a rectifier embodying my invention.
Fig. 2 is a longitudinal vertical sectional view on line 2—2 of Fig. 1.
Fig. 6 is a plan view of a detail.

Referring to the drawings, the numeral 5 refers generally to a rectifier housing for a standard unit or stack comprising a shaft 6 on which are mounted a plurality of rectifier disks 1. Interposed in the rectifier stack between adjacent disks 1 are a plurality of fins 7 which serve to radiate heat generated by the passage of current through the disks, and which also serve as convenient terminals for making electrical connections with the disks. The housing 5 comprises a main housing section 8 fitted at its ends into the flanged closure members 9, 10, respectively. The top portion 8' of housing section 8 terminates short of the plane of the front portion 8'' and the latter likewise terminates short of the plane of said top portion 8', with the result that an opening 11 is provided in said housing section. A bracket member 12 having a horizontal portion 12' and a vertical portion 12'' is adapted to close said opening 11 and is provided with flanges 13, 14, respectively for engaging the respective top and front walls 8', 8'' of the housing section 8. The horizontal portion 12' of said bracket member 12 is shown extending over the flanges 9', 10' of the respective end members 9, 10, to which flanges said portion 12' may be secured by suitable screws 15. The vertical portion 12'' of bracket 12 may similarly be secured through screws 16 to vertical flanges 9'', 10'' respectively on said end members. A series of posts 17 forming electric terminals are mounted in a base 18 of insulating material secured to the bracket 12 by screws 19, the heads of said posts being insulated from said bracket by a sheath of insulating material 20. There is also adapted to be secured to said bracket 12 through screws 21 a frame 22 for supporting a transformer or reactor unit 23, which may be of any suitable or conventional type.

Referring to Fig. 5 it will be seen that the primary 23' of the unit 23 is connected to two of the terminals 17, which terminals are intended to be connected to a source of alternating current. The secondary 23'' of said transformer is connected through wires 24 to two of the fins 7. Connected to two others of said fins are wires 25 which lead to the remaining pair of terminals 17. The disks 1 are of such character as to permit the passage of current in but one direction with the result that direct current is supplied to the terminals connected to wires 25, as is well understood in the art. The bracket 12 is provided with an opening 26 permitting the passage of the wires 24 from the fins 7 to the secondary 23'' and the wires 25 from said fins to terminals 17. Said wires are adapted to be secured to ears 7' projecting from said fins.

As previously stated, I provide means facilitating the positioning of the rectifier unit in proper relation to the housing and for maintaining said unit in such relation. For this purpose I provide a pair of bushings 27, 28, adapted to fit over the respective ends of the shaft 6 and over the nuts 29, 30 on said ends; each bushing having an interior recess 31 of polygonal configuration corresponding to that of said nuts and also having a recess 32 for receiving an end of said shaft. The end members 9, 10 of the housing are provided with bell portions 33, 34, in which the bushings 27, 28 are adapted to seat. One of said bushings has integral therewith a projection 35 adapted to be received in an aperture 36 in the bell portion 33. The bushings 27, 28, as well as the projection 35 aforesaid, are of insulating material.

In the operation of assembly the bushing 27 may first be fitted into the bell portion 33 of the end element 9 of the housing, with the projection 35 of said bushing engaging the opening 36 in said bell portion, the member 10 being out of engagement with the housing so that the corresponding end thereof is open. The rectifier unit may now be inserted into the housing through said open end and the nut 29 and adjacent end of the shaft 6 fitted into said bushing. Before inserting said end portion of the rectifier unit in the bushing 27, however, the unit is turned so as to occupy the desired relation to the housing. More specifically, the unit should preferably occupy such position that the terminal ears 7' of the fins 7 are adjacent the housing opening 11, so that when the bracket 12 is applied to the housing said terminals 7' will be near the opening 26 and as close as practicable to the terminals 17 to which wires 25 are connected, and to the secondary 23'' of transformer 23 to which wires 24 are connected. After the rectifier unit has been turned into such relation with the housing and has been engaged with the bushing 27 as aforesaid, the bushing 28 may be applied to the opposite end of the shaft 6 of said unit, and the end element 10 of the rectifier housing may then be applied to the housing section 8 with the bell portion 34 of said element receiving the bushing 28.

Instead of first fitting the bushing 27 into the bell portion 33 said bushing may be applied to the end of shaft 6 and to nut 29 of the rectifier unit with the projection 35 in such relation to said unit that said projection will enter the opening 36 only when the unit occupies a position in proper relation to the housing. Upon then inserting the unit in the housing and engaging projection 35 in opening 36, the bushing 28 and end element 10 may be inserted in place as above described to complete the assembly of the unit in the housing.

From the foregoing description it will be apparent that through the bushing 27 and projection 35 in cooperation with opening 36, the positioning of the rectifier unit in the desired relation to the housing is facilitated. It will be further seen that through this arrangement the rectifier unit is maintained in the desired relation to the housing and that turning of said unit and short circuiting thereof by contacting with the metal of the housing are prevented. The bushings 27 and 28 also serve to effectively insulate the rectifier unit from the housing.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

What I claim is:

1. In combination, a rectifier unit, a housing member within which said unit is adapted to be positioned, a bushing member adapted for supporting said unit within said housing, and a projection on one of said members engaging in an aperture in the other for preventing turning of said unit about its longitudinal axis out of a given relation to said housing.

2. In combination, a rectifier unit, a bushing, means preventing relative rotation between said bushing and said unit, a housing for said unit, means on said housing for receiving said bushing, and means for preventing relative rotation between said bushing and said housing.

3. In combination, a rectifier unit, a housing member within which said unit is adapted to be positioned, an insulating bushing member adapted for supporting said unit within said housing, and a projection on one of said members cooperating with an aperture in the other for preventing shifting of said unit out of a given relation to said housing.

4. In combination, a rectifier unit, a housing member including an end element having a bushing supporting portion, a bushing receivable in said portion, and forming a support for said unit, projection and aperture engaging means between said bushing and said portion for preventing turning of said bushing with respect to said portion, and means between said bushing and said unit for preventing turning of said unit with respect to said bushing.

5. In combination, a rectifier unit, a housing therefor, a bushing forming a support for said unit, means between said bushing and said unit for preventing rotation of said unit with respect to said bushing, means in said housing for receiving said bushing, and means precluding complete insertion of said bushing into said receiving portion until said bushing occupies a given position with respect to said housing.

In testimony whereof, I have signed my name to this specification this 3rd day of January, 1930.

CONRAD H. ZIERDT.